United States Patent
Rigney et al.

(10) Patent No.: US 6,586,115 B2
(45) Date of Patent: Jul. 1, 2003

(54) YTTRIA-STABILIZED ZIRCONIA WITH REDUCED THERMAL CONDUCTIVITY

(75) Inventors: Joseph David Rigney, Milford, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/833,446

(22) Filed: Apr. 12, 2001

(65) Prior Publication Data

US 2002/0172838 A1 Nov. 21, 2002

(51) Int. Cl.$^7$ .................... B32B 15/04; F03B 12/03
(52) U.S. Cl. ................. 428/633; 428/469; 428/699; 428/701; 428/702; 428/307.3; 416/241 B
(58) Field of Search ................... 428/632, 633, 428/655, 304.4, 307.3, 469, 472, 697, 699, 701, 702; 416/241 B

(56) References Cited

U.S. PATENT DOCUMENTS

| | | | |
|---|---|---|---|
| 4,112,137 A | | 9/1978 | Zega |
| 4,588,655 A | * | 5/1986 | Kushner |
| 4,742,030 A | * | 5/1988 | Masaki et al. |
| 4,774,150 A | | 9/1988 | Amano et al. |
| 4,985,379 A | * | 1/1991 | Egerton et al. |
| 4,996,117 A | | 2/1991 | Chu et al. |
| 5,296,274 A | | 3/1994 | Movchan et al. |
| 5,418,003 A | | 5/1995 | Bruce et al. |
| 5,474,809 A | | 12/1995 | Skelly et al. |
| 5,512,382 A | | 4/1996 | Strangman |
| 5,562,998 A | | 10/1996 | Strangman |
| 5,773,078 A | | 6/1998 | Skelly |
| 5,792,521 A | | 8/1998 | Wortman |
| 5,834,070 A | | 11/1998 | Movchan et al. |
| 5,981,088 A | * | 11/1999 | Bruce et al. |
| 6,025,078 A | * | 2/2000 | Rickerby et al. |
| 6,044,830 A | * | 4/2000 | Jones |
| 6,190,124 B1 | * | 2/2001 | Freling et al. |
| 6,312,832 B1 | * | 11/2001 | Alperine et al. |
| 6,352,788 B1 | * | 3/2002 | Bruce |

FOREIGN PATENT DOCUMENTS

| | | |
|---|---|---|
| EP | 166097 | 1/1986 |
| EP | 825271 | 2/1998 |

* cited by examiner

Primary Examiner—Deborah Jones
Assistant Examiner—Jennifer McNeil
(74) Attorney, Agent, or Firm—David L. Narciso; Gary M. Hartman; Domenica N. S. Hartman

(57) ABSTRACT

A thermal barrier coating (TBC) for a component intended for use in a hostile environment, such as the superalloy turbine, combustor and augmentor components of a gas turbine engine. The TBC is formed of zirconia that is partially stabilized with yttria (YSZ), preferably not more than 3 weight percent yttria, and to which one or more additional metal oxides are alloyed to increase crystallographic defects and lattice strains in the TBC grains and/or form precipitates of zirconia and/or compound(s) of zirconia and/or yttria and the additional metal oxide(s), the inclusion of which reduces the thermal conductivity of the YSZ to levels lower than conventional 6–8% YSZ. Improvements are particularly contemplated for TBC having a columnar grain structure, such as those deposited by EBPVD and other PVD techniques.

18 Claims, 1 Drawing Sheet

YTTRIA-STABILIZED ZIRCONIA WITH REDUCED THERMAL CONDUCTIVITY

FIELD OF THE INVENTION

This invention relates to coating materials, such as thermal insulating coatings for components exposed to high temperatures. More particularly, this invention is directed to a method of reducing the thermal conductivity of a thermal barrier coating (TBC) formed of yttria-stabilized zirconia.

BACKGROUND OF THE INVENTION

Higher operating temperatures for gas turbine engines are continuously sought in order to increase their efficiency. However, as operating temperatures increase, the high temperature durability of the components within the hot gas path of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack and may not retain adequate mechanical properties. For this reason, these components are often protected by a thermal barrier coating (TBC) system. TBC systems typically include an environmentally-protective bond coat and a thermal-insulating ceramic topcoat, often referred to as the TBC. Bond coat materials widely used in TBC systems include oxidation-resistant overlay coatings such as MCrAlX (where M is iron, cobalt and/or nickel, and X is yttrium, another rare earth element, or a reactive element such as zirconium), and oxidation-resistant diffusion coatings such as diffusion aluminides that contain aluminum intermetallics.

Zirconia ($ZrO_2$) that is partially or fully stabilized by yttria ($Y_2O_3$), magnesia (MgO) or another alkaline-earth metal oxide, ceria ($CeO_2$) or another rare-earth metal oxide, or mixtures of these oxides has been employed as TBC materials. Binary yttria-stabilized zirconia (YSZ) has particularly found wide use as the TBC material on gas turbine engine components because of its low thermal conductivity, high temperature capability including desirable thermal cycle fatigue properties, and relative ease of deposition by plasma spraying, flame spraying and physical vapor deposition (PVD) techniques such as electron beam physical vapor deposition (EBPVD). TBC's employed in the highest temperature regions of gas turbine engines are often deposited by PVD, particularly EBPVD, which yields a strain-tolerant columnar grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., cathodic arc, laser melting, etc.). In contrast, plasma spraying techniques such as air plasma spraying (APS) deposit TBC material in the form of molten "splats," resulting in a TBC characterized by a degree of inhomogeneity and porosity.

As is known in the art, zirconia is stabilized with the above-noted oxides to inhibit a tetragonal to monoclinic phase transformation at about 1000° C., which results in a volume expansion that can cause spallation. At room temperature, the more stable tetragonal phase is obtained and the undesirable monoclinic phase is minimized if zirconia is stabilized by at least about six weight percent yttria. An yttria content of seventeen weight percent or more ensures a fully stable cubic phase. Though thermal conductivity of YSZ decreases with increasing yttria content, the conventional practice has been to stabilize zirconia with at least six weight percent, and more typically to only partially stabilize zirconia with six to eight weight percent yttria (6–8% YSZ) with the understanding that 6–8% YSZ TBC is more adherent and spall-resistant to high temperature thermal cycling than YSZ TBC containing greater and lesser amounts of yttria. Limited exceptions have generally included plasma-sprayed zirconia said to be stabilized by mixtures of yttria, magnesia, calcia or ceria, to which certain oxides may be added at specified levels to obtain a desired effect. For example, according to U.S. Pat. No. 4,774,150 to Amano et al., $Bi_2O_3$, $TiO_2$, $Tb_4O_7$, $Eu_2O_3$ and/or $Sm_2O_3$ may be added to certain layers of a TBC formed of zirconia stabilized by yttria, magnesia or calcia, for the purpose of serving as "luminous activators," and U.S. Pat. No. 4,996,117 to Chu et al. discloses forming a TBC (e.g., zirconia stabilized with yttria or magnesia) whose individual particles are coated with a corrosion-resistant layer of silica ($SiO_2$), alumina ($Al_2O_3$), an aluminum silicate, a zirconium silicate, an aluminum titanate, or a mixture thereof.

Contrary to the conventional practice of stabilizing zirconia with at least six weight percent yttria, U.S. Pat. No. 5,981,088 to Bruce showed that zirconia partially stabilized by less than six weight percent yttria exhibits superior erosion and impact resistance as compared to conventional YSZ. The basis for this improvement is not well understood, though it is believed that YSZ TBC containing less than six weight percent yttria, particularly about four weight percent yttria, exhibits increased fracture toughness that is responsible for improved erosion and impact resistance.

In order for TBC to remain effective throughout the planned life cycle of the component it protects, it is important that the TBC maintains a low thermal conductivity throughout the life of the component. However, the thermal conductivity of columnar YSZ TBC is known to increase over time when subjected to the operating environment of a gas turbine engine as a result of grain and/or pore coarsening or redistribution. Consequently, YSZ TBC is often deposited on gas turbine engine components to a greater thickness than would otherwise be necessary. Alternatively, internally cooled components such as blades and nozzles must be designed to have higher cooling flow. Both of these solutions are undesirable for reasons relating to cost, component life and engine efficiency.

In view of the above, it can be appreciated that further improvements in TBC technology are desirable, particularly as TBC's are employed to thermally insulate components intended for more demanding engine designs.

BRIEF SUMMARY OF THE INVENTION

The present invention generally provides a coating material, such as for a thermal barrier coating (TBC) of a component intended for use in a hostile environment, such as the superalloy turbine, combustor and augmentor components of a gas turbine engine. The coating material is zirconia that is partially stabilized with yttria (YSZ), preferably not more than three weight percent yttria, and to which one or more additional metal oxides are alloyed to increase crystallographic defects and lattice strain energy in the coating grains and, optionally, form second phases of zirconia and/or compound(s) of zirconia and/or yttria and the additional metal oxide(s). According to the invention, increasing the crystallographic defects and lattice strain energy within the YSZ lattice significantly reduces the thermal conductivity of the YSZ compared to that obtained with conventional 6–8% YSZ. Improvements obtained by this invention are particularly evident with YSZ coatings having a columnar grain structure, such as those deposited by EBPVD and other PVD techniques, though the invention is also applicable to coatings deposited by such methods as plasma spraying.

In the present invention, increased crystallographic defects and lattice strain energy are the result of composition-induced defect reactions in a coating that consists essentially of zirconia partially stabilized by up to three weight percent yttria, and to which is alloyed very specific amounts of one or more additional metal oxides that have solid solubility in zirconia and are responsible for the desired defect reactions and/or increased lattice strain due to ion size differences. These metal oxides are limited to the alkaline-earth metal oxides magnesia (MgO), calcia (CaO), strontia (SrO) and barium oxide (BaO), the rare-earth metal oxides lanthana ($La_2O_3$), ceria ($CeO_2$), neodymia ($Nd_2O_3$), gadolinium oxide ($Gd_2O_3$) and dysprosia ($DY2O_3$), as well as such metal oxides as nickel oxide (NiO), ferric oxide ($Fe_2O_3$), cobaltous oxide (CoO), and scandium oxide ($Sc_2O_3$). If present in an appropriate and limited amount, each of the above metal oxides has the effect of increasing crystallographic defects and/or lattice strains in the coating grains by affecting the presence of metal or oxygen sublattice vacancies, and/or causing strains from the substitution of different size metal atoms on zirconium sites. Notably, the degree to which crystallographic defects and/or lattice strain is required to be increased with the additional metal oxides of this invention excludes such oxides as hafnia ($HfO_2$), titania ($TiO_2$), tantalum oxide ($Ta_2O_5$), niobium oxide ($Nb_2O_5$), erbia ($Er_2O_3$) and ytterbia ($Yb_2O_3$), as well as others.

According to the invention, increasing the number of defects and/or strain energy in the YSZ lattice by the inclusion of the above-noted oxides serves to significantly increase the resistance to heat transfer through YSZ, and therefore through a coating (e.g., TBC) formed of the YSZ. These oxides also have the capability of promoting the formation of precipitates of zirconia and/or compound(s) of zirconia and/or yttria and the additional metal oxide(s). These second phase precipitates are believed to provide scattering sites for lattice vibrations (phonons), which contribute to the thermal conductivity of the coating.

As a result of exhibiting greater resistance to heat transfer, YSZ TBC's in accordance with this invention can be subsequently heated to temperatures encountered within the hot gas path of a gas turbine engine and, though grain and pore coarsening may occur, the TBC will maintain a thermal conductivity at a level equal to or lower than that possible with conventional 6–8% YSZ TBC subjected to identical conditions. Therefore, gas turbine engine components can be designed for thinner TBC and/or, where applicable, lower cooling air flow rates, which reduces processing and material costs and promotes component life and engine efficiency.

Other objects and advantages of this invention will be better appreciated from the following detailed description.

DETAILED DESCRIPTION OF THE INVENTION

Figure 1:
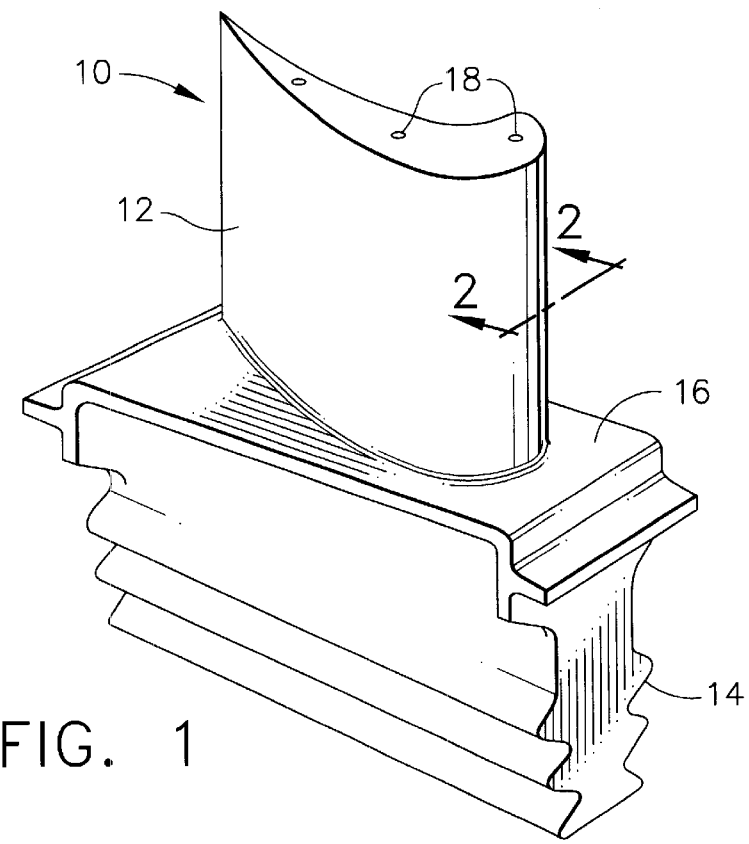
FIG. 1 is a perspective view of a high pressure turbine blade.

The present invention is generally applicable to components subjected to high temperatures, and particularly to components such as the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to hot combustion gases as well as attack by oxidation, corrosion and erosion. The airfoil 12 is protected from its hostile operating environment by a thermal barrier coating (TBC) system schematically depicted in FIG. 2. The airfoil 12 is anchored to a turbine disk (not shown) with a dovetail 14 formed on a root section 16 of the blade 10. Cooling passages 18 are present in the airfoil 12 through which bleed air is forced to transfer heat from the blade 10. While the advantages of this invention will be described with reference to the high pressure turbine blade 10 shown in FIG. 1, the teachings of this invention are generally applicable to any component on which a thermal barrier coating may be used to protect the component from a high temperature environment.

Figure 2:
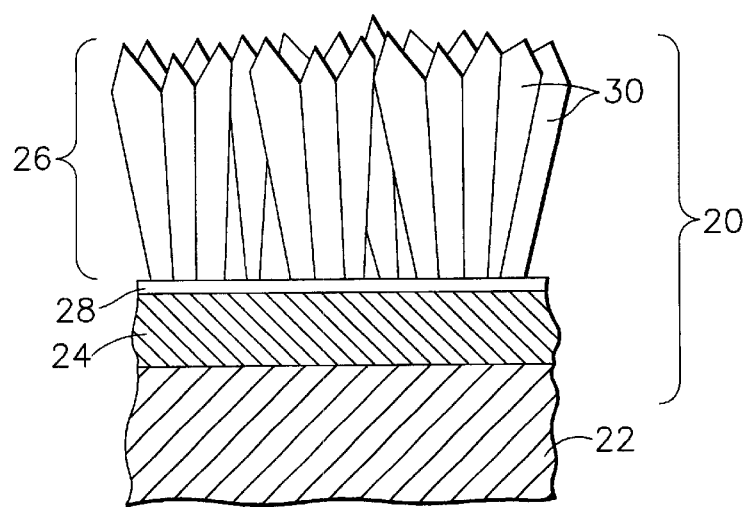
FIG. 2 is a cross-sectional view of the blade of FIG. 1 along line 2—2, and shows a thermal barrier coating system on the blade in accordance with this invention.

The TBC system 20 is represented in FIG. 2 as including a metallic bond coat 24 that overlies the surface of a substrate 22, the latter of which is typically a superalloy and the base material of the blade 10. As is typical with TBC systems for components of gas turbine engines, the bond coat 24 is an aluminum-rich composition, such as an overlay coating of an MCrAlX alloy or a diffusion coating such as a diffusion aluminide or a diffusion platinum aluminide of a type known in the art. Aluminum-rich bond coats of this type develop an aluminum oxide (alumina) scale 28, which is grown by oxidation of the bond coat 24. The alumina scale 28 chemically bonds a thermal-insulating ceramic layer, or TBC 26, to the bond coat 24 and substrate 22. The TBC 26 of FIG. 2 is represented as having a strain-tolerant microstructure of columnar grains. As known in the art, such columnar microstructures can be achieved by depositing the TBC 26 using a physical vapor deposition technique, such as EBPVD. The TBC 26 is deposited to a thickness that is sufficient to provide the required thermal protection for the underlying substrate 22 and blade 10, generally on the order of about 75 to about 300 micrometers.

While much of the following discussion will focus on columnar TBC of the type shown in FIG. 2, the invention is also believed to be applicable to noncolumnar TBC deposited by such methods as plasma spraying, including air plasma spraying (APS). The microstructure of this type of TBC is well known in the art, and is the result of the TBC material being deposited in the form of molten "splats" to yield irregular flattened grains and a degree of inhomogeneity and porosity.

Heat transfer through the columnar grain structure of the TBC 26 is primarily by conduction through the individual columnar grains. According to the invention, resistance to heat transfer through the TBC 26 is believed to be enhanced by microstructural defects within the grains created by process-induced porosity and composition-induced defect reactions. Process-induced porosity includes pore formation that occurs as a component being coated (e.g., the blade 10) is rotated relative to a vapor cloud, such as that produced by PVD, the result of which is a textured deposit in which pores are formed between columns and between secondary growth arms (not shown) extending from columns. As used herein, composition-induced defect reactions include vacancies that result from the need in ionic solids to maintain charge neutrality, as is the case in YSZ where substitution of zirconia ($ZrO_2$) with yttria ($Y_2O_3$) in the lattice yields a vacancy. These lattice defects cannot be controlled through microstructural manipulation, as the atomic defects are based solely on thermodynamics and are not process-dependent. Therefore, compositional changes (substitutional changes that affect defect reactions) are the only way to affect the concentration of this type of defect.

With the present invention, composition-induced defect reactions are increased to promote a lower thermal conductivity for the TBC 26. The TBC 26 consists essentially of zirconia partially stabilized by up to three weight percent yttria (and therefore is based on the binary YSZ system), but with the addition of at least one additional metal oxide that increases the crystallographic defects and/or lattice strain energy. Under the theory discussed above, increased crystallographic defects and/or lattice strain energy will reduce the thermal conductivity of the TBC 26 as compared to conventional 6–8% YSZ. More particularly, lower thermal conductivities are achieved by adding metal oxides that increase defect concentrations closer to the amorphous limit in zirconia without significantly increasing the density of the TBC 26 (which occurs if YSZ contains 20 weight percent yttria). Optionally, these metal oxides may serve to precipitate higher volume fractions of monoclinic or tetragonal zirconia precipitates and/or equilibrium compounds of yttria and the additional metal oxide(s).

Metal oxides with varying stoichiometries are capable of the above-noted effects, such as $M_2O$, $MO$, $M_2O_3$, $M_2O_5$ and $MO_3$. Because of the ionic bonding character in zirconia (which requires charge balance), additions of oxides of different stoichiometries affect the presence of metal or oxygen sublattice vacancies and/or cause strains to develop from the substitution of different size metal atoms (cations) on zirconium sites. The strain energies provided by the presence of these sites can act as scattering sites for lattice vibrations (phonons), which contribute to the thermal conductivity of YSZ. It is believed that those metal oxides that produce oxide defects and high strains due to ionic size will be most effective.

Table I lists those metal oxides identified by this invention that, when added to zirconia partially stabilized by up to three weight percent yttria, preferably one to three weight percent yttria, reduce the thermal conductivity of the material, and particular a TBC having a columnar microstructure as shown in FIG. 2. The 1–3% yttria range is preferred for alloying with one or more of the additional oxides while maintaining relatively low total volume fractions of stabilizers and structure modifiers to the zirconia lattice. The indicated amounts for the metal oxides (in weight percent) are based on the calculated lower and upper limits required to achieve fractions of site defects of about 3.9 mole percent and 12 mole percent, which correspond to the mole fractions of site defects achieved with 7% YSZ and 20% YSZ, respectively. Levels equivalent to 7% YSZ were chosen as lower limits to ensure that the thermal conductivity of the TBC is at least the same as that of conventional 6–8% YSZ TBC, while levels equivalent to 20% YSZ were chosen because amounts exceeding the defect level associated with 20% YSZ do not produce any substantially greater reduction in thermal conductivity. All of the oxides listed in Table I have the effect of increasing defects and lattice strain, with the exception of those oxides identified as contributing only to lattice strain. Also indicated in Table I is the percent metal ion diameter size difference ("% Ion Size Difference") of the particular oxide relative to zirconium ions ($Zr^{4+}$), and the mole percent defects created per weight percent of the oxide added ("Mole % Defects Created"). Percent ion size difference is indicative of the amount of lattice strain energy induced by the oxide (positive values indicate that $Zr^{4+}$ is a smaller ion, inducing compressive strains; negative values indicate that $Zr^{4+}$ is a larger ion, inducing tensile strains). The mole percent defects value is indicative of the efficiency with which the particular oxide introduces additional point defects (anion and cation vacancies) into 3% YSZ lattice. Yttria is also included in Table I as a baseline comparison for the additional oxides of this invention.

TABLE I

| Oxide | Range (wt. %) | % Ion Size Difference Oxide | Mole % Defects Created per wt% |
|---|---|---|---|
| MgO | 0.8–3.6 | 16 | 2.8 |
| CaO | 1.0–5.0 | −25 | 2.0 |
| SrO | 1.9–8.8 | −42 | 1.2 |
| BaO | 2.7–12.3 | −70 | 0.8 |
| NiO | 1.4–6.5 | +9 | 1.6 |
| $Fe_2O_3$ | 2.8–12.8 | +19 | 0.8 |
| CoO | 1.4–6.5 | +20 | 1.6 |
| $Sc_2O_3$ | 2.5–11.3 | −3 | 0.9 |
| $La_2O_3$ | 5.8–22.5 | −34 | 0.5 |
| $Nd_2O_3$ | 5.7–23.0 | −27 | 0.5 |
| $Gd_2O_3$ | 6.0–24.3 | 19 | 0.4 |
| $Dy_2O_3$ | 6.3–24.8 | −15 | 0.4 |
| $CeO_2$(a) | 1.0–30.0 | −30 | — |
| $Y_2O_3$ | 4.0–17.0 | −13 | 0.6 |

(a) Primarily contributes only to lattice strain in $ZrO_2$.

Magnesia, calcia, strontia and barium oxide are alkaline-earth metal oxides, while lanthana, ceria, neodymia, gadolinium oxide and dysprosia are rare-earth metal oxides. While alkaline-earth metal oxides and rare-earth metal oxides have been used in the past to stabilize zirconia, the present invention makes use of very specific and limited amounts of these oxides in combination with only up to three weight percent yttria, the effect of which is for the specific purpose of intentionally creating crystallographic defects that will suppress the thermal conductivity of YSZ TBC, even when exposed to high operating temperatures of a gas turbine engine. For this purpose, preferred metal oxides are those with an absolute percent ion size difference and a mole percent defects value at least equal to that of the yttrium anion ($Y^{3+}$). Consequently, preferred metal oxides are magnesia, calcia, strontia, barium oxide, ferric oxide and cobaltous oxide, each of which has an absolute percent ion size difference of at least 13 percent, and a mole percent defects value of at least 0.6 mole %/wt. %.

The creation of second phases along with the defect/strained structures discussed above is believed to promote even lower thermal conductivities as a result of providing different types of scattering sites. Examples of second phases include coherent and semi-coherent monoclinic and tetragonal zirconia precipitates, which are believed to form within pores and at grain boundaries of the zirconia lattice. Other possible second phases include compounds such as $BaZrO_3$, $SrZrO_3$ and $Y_3Fe_5O_{12}$ formed when barium oxide, strontia and ferric oxide, respectively, are added as the additional oxide(s) to the binary YSZ system. A combination of metal oxides is believed to be necessary to produce both effects, i.e., the desired crystallographic defects and the optional second phases.

A suitable process for depositing the columnar TBC 26 of FIG. 2 is a physical vapor deposition process, alone or assisted by chemical vapor deposition (CVD). A preferred process is believed to be EBPVD, which generally entails loading a component (such as the blade 10 of FIG. 1) to be coated into a coating chamber, evacuating the chamber, and then backfilling the chamber with oxygen and an inert gas such as argon to achieve a subatmospheric chamber pressure. The component is then supported in proximity to one or more ingots of the desired coating materials, and one or more electron beams are projected onto the ingot(s) so as to evaporate the ingots and produce a vapor that deposits (condenses) on the component surface. While similar in most respects to conventional EBPVD, the process for depositing the columnar TBC 26 of this invention requires that each TBC coating material (YSZ and the additional metal oxide(s)) is present within one or more of the ingots. For example, the TBC 26 can be deposited by simultaneously evaporating separate ingots of YSZ and the additional metal oxide(s). Alternatively, a single ingot containing YSZ and regions or a dispersion of the additional metal oxide(s) can be evaporated to produce the TBC 26. Another alternative is to evaporate a single ingot of YSZ using a chemical vapor deposition (CVD)-assisted process in which a source of the additional metal oxide(s) is introduced in the form of a metal vapor that is continuously introduced into the coating chamber, and which in the presence of oxygen oxidizes to deposit the oxide of the metal along with YSZ evaporated from the YSZ ingot. Still another alternative method is to use an ion beam source of the metal(s) (cathodic arc source) corresponding to the desired additional metal oxide(s), which in the presence of oxygen causes oxidation of the metal and deposition of the metal oxide along with YSZ evaporated from a YSZ ingot.

Alternatively, the modified YSZ compositions of this invention could be deposited as a noncolumnar TBC using a plasma spraying technique, such as air plasma spraying (APS). Plasma spraying TBC's in accordance with this invention can be performed by melting a mixture of YSZ powder and a powder of the additional metal oxide(s) in the desired proportion with a plasma generated by a plasma spray gun. The molten powder particles impact the surface of the component, yielding grains in the form of "splats," as known in the art.

In view of the above, the present invention provides an improved YSZ TBC having a reduced (lower) thermal conductivity compared to conventional 6–8% YSZ, and whose microstructure is stabilized so that its thermal conductivity remains equal to or lower than conventional 6–8% YSZ, even after the TBC is subjected to high temperature excursions. The one or more metal oxides are added in specific amounts to increase crystallographic defects and lattice strain energy in the TBC grains, thereby decreasing the thermal conductivity of the TBC, without degrading other properties of the TBC.

While the invention has been described in terms of particular embodiments, it is apparent that other forms could be adopted by one skilled in the art. Accordingly, the scope of the invention is to be limited only by the following claims.

What is claimed is:

1. A component having a coating on a surface thereof, the coating consisting essentially of zirconia partially stabilized by up to 3 weight percent yttria and to which is alloyed at least one additional metal oxide chosen from the group consisting of calcia, strontia, barium oxide, lanthana and up to 20 weight percent ceria, the coating having a microstructure consisting of columnar grains so that the microstructure is columnar, the microstructure containing crystallographic defects formed by the additional metal oxide and that reduce the thermal conductivity of the coating.

2. A component according to claim 1, wherein the at least one additional metal oxides is chosen from the group consisting of, in weight percent: 1.0 to 5.0% calcia, 1.9 to 8.8% strontia, 2.7 to 12.3% barium oxide, 5.8 to 22.5% lanthana, and 1.0 to 20% ceria.

3. A component according to claim 1, wherein the coating has a microstructure containing precipitates of zirconia and/or at least one oxide compound of the additional metal oxide within pores and at grain boundaries of the zirconia lattice, the precipitates reducing the thermal conductivity of the coating.

4. A component according to claim 1, wherein the coating has a microstructure containing precipitates of at least one compound of zirconia and/or yttria and the additional metal oxide, the precipitates reducing the thermal conductivity of the coating.

5. A component according to claim 1, wherein the coating consists of zirconia, yttria and the additional metal oxide.

6. A component according to claim 5, wherein the additional metal oxide is one or more selected from the group consisting of calcia, strontia, and barium oxide.

7. A component according to claim 5, wherein the additional metal oxide is lanthana and/or ceria.

8. A component according to claim 1, further comprising at least one metal oxide chosen from the group consisting of magnesia, nickel oxide, ferric oxide, cobaltous oxide, scandium oxide, neodymia and dysprosia.

9. A component according to claim 1, wherein the additional metal oxide is calcia, strontia, barium oxide, or lanthana.

10. A component according to claim 1, wherein the zirconia is partially stabilized by 1 to 3 weight percent yttria.

11. A gas turbine engine component comprising:

a superalloy substrate;

a metallic bond coat on a surface of the substrate; and a thermal barrier coating having a columnar microstructure, the thermal barrier coating consisting essentially of zirconia partially stabilized by 1 to 3 weight percent yttria and to which is alloyed, in weight percent, one of the following additional metal oxides: 1.0 to 5.0% calcia, 1.9 to 8.8% strontia, 2.7 to 12.3% barium oxide, 5.8 to 22.5% lanthana, and 1.0 to 20% ceria, the thermal barrier coating having a microstructure containing crystallographic defects formed by the additional metal oxide and that reduce the thermal conductivity of the thermal barrier coating.

12. A gas turbine engine component according to claim 11, wherein the thermal barrier coating has a microstructure containing precipitates of zirconia and/or at least one oxide compound of the additional metal oxide, the precipitates reducing the thermal conductivity of the thermal barrier coating.

13. A gas turbine engine component according to claim 12, wherein the precipitates of zirconia are monoclinic and/or tetragonal phases.

14. A gas turbine engine component according to claim 11, wherein the thermal barrier coating has a microstructure containing precipitates of at least one compound of zirconia and/or yttria and the additional metal oxide, the precipitates reducing the thermal conductivity of the thermal barrier coating.

15. A gas turbine engine component according to claim 11, wherein the additional metal oxide is calcia.

16. A gas turbine engine component according to claim 11, wherein the additional metal oxide is strontia.

17. A gas turbine engine component according to claim 11, wherein the additional metal oxide is barium oxide.

18. A gas turbine engine component according to claim 11, wherein the additional metal oxide is lanthana.

* * * * *